(12) United States Patent
Münzer

(10) Patent No.: US 8,156,714 B2
(45) Date of Patent: Apr. 17, 2012

(54) BEVERAGE BOTTLING PLANT FOR FILLING BEVERAGE BOTTLES WITH A BEVERAGE BOTTLE TREATMENT MACHINE AND A BEVERAGE BOTTLE TREATMENT MACHINE IN A BEVERAGE BOTTLING PLANT

(75) Inventor: Jan Münzer, Friedrichstadt (DE)

(73) Assignee: KHS AG, Dortmund (DE)

( * ) Notice: Subject to any disclaimer, the term of this patent is extended or adjusted under 35 U.S.C. 154(b) by 372 days.

(21) Appl. No.: 12/509,905

(22) Filed: Jul. 27, 2009

(65) Prior Publication Data

US 2010/0186347 A1 Jul. 29, 2010

Related U.S. Application Data

(63) Continuation-in-part of application No. PCT/EP2007/011009, filed on Dec. 14, 2007.

(30) Foreign Application Priority Data

Jan. 26, 2007 (DE) .......................... 10 2007 003 976

(51) Int. Cl.
*B65B 63/08* (2006.01)
(52) U.S. Cl. ........................................... 53/127; 53/425
(58) Field of Classification Search ................... 53/127, 53/167, 425, 426, 440
See application file for complete search history.

(56) References Cited

U.S. PATENT DOCUMENTS

| | | | | |
|---|---|---|---|---|
| 3,622,357 A | * | 11/1971 | Tillman | 99/370 |
| 4,263,254 A | * | 4/1981 | Huling | 422/25 |
| 4,279,858 A | * | 7/1981 | Huling | 422/25 |
| 4,331,629 A | * | 5/1982 | Huling | 422/25 |
| 4,490,401 A | | 12/1984 | Becker et al. | |
| 7,600,542 B2 | * | 10/2009 | Wiedemann et al. | 141/91 |

FOREIGN PATENT DOCUMENTS

| | | |
|---|---|---|
| DE | 1 963 688 | 6/1971 |
| DE | 26 45 835 | 4/1978 |
| DE | 43 14 662 | 11/1994 |
| DE | 694 14 611 | 7/1999 |

(Continued)

OTHER PUBLICATIONS

International Search Report PCT/EP2007/011009 and English translation thereof.

(Continued)

*Primary Examiner* — Sameh H. Tawfik
(74) *Attorney, Agent, or Firm* — Nils H. Ljungman & Associates

(57) ABSTRACT

A beverage bottling plant for filling beverage bottles with a beverage bottle treatment machine and a beverage bottle treatment machine in a beverage bottling plant. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 6 Drawing Sheets

FOREIGN PATENT DOCUMENTS

| | | |
|---|---|---|
| DE | 199 08 035 | 8/2000 |
| DE | 100 42 528 | 3/2002 |
| DE | 20 317 441 | 6/2004 |
| DE | 103 51 689 | 6/2005 |
| EP | 0 430 907 | 6/1991 |
| FR | 2 520 984 | 8/1983 |
| JP | 61-43979 A | 5/1994 |
| JP | 2001-333753 A | 12/2001 |

OTHER PUBLICATIONS

International Preliminary Report on Patentability PCT/EP2007/011009 and English translation thereof.

* cited by examiner

BEVERAGE BOTTLING PLANT FOR FILLING BEVERAGE BOTTLES WITH A BEVERAGE BOTTLE TREATMENT MACHINE AND A BEVERAGE BOTTLE TREATMENT MACHINE IN A BEVERAGE BOTTLING PLANT

CONTINUING APPLICATION DATA

This application is a Continuation-In-Part application of International Patent Application No. PCT/EP2007/011009, filed on Dec. 14, 2007, which claims priority from Federal Republic of Germany Patent Application No. 10 2007 003 976.1, filed on Jan. 26, 2007. International Patent Application No. PCT/EP2007/011009 was pending as of the filing date of this application. The United States was an elected state in International Patent Application No. PCT/EP2007/011009.

BACKGROUND

1. Technical Field

The present application relates to a device and a method for treating containers filled with liquid, such as for example beverage bottles or beverage cans. In this case, part of the heat exchanger is realized by a heat pump being provided between one or more segments of the treating zone and those of the cooling zone.

2. Background Information

Background information is for informational purposes only and does not necessarily admit that subsequently mentioned information and publications are prior art.

A beverage bottling plant for filling bottles with a liquid beverage filling material can possibly comprise a beverage filling machine, which is often a rotary filling machine, with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material.

Some beverage bottling plants may possibly comprise filling arrangements that receive a liquid beverage material from a toroidal or annular vessel, in which a supply of liquid beverage material is stored under pressure by a gas. The toroidal vessel may also be connected to at least one external reservoir or supply of liquid beverage material by a conduit or supply line. In some circumstances it may even be possible that a beverage bottling plant has two external supply reservoirs, each of which may be configured to store either the same liquid beverage product or different products. These reservoirs could possibly be connected to the toroidal or annular vessel by corresponding supply lines, conduits, or other arrangements. It is also possible that the external supply reservoirs could be in the form of simple storage tanks, or in the form of liquid beverage product mixers.

A wide variety of types of filling elements are used in filling machines in beverage bottling or container filling plants for dispensing a liquid product into bottles, cans or similar containers, including but not limited to filling processes that are carried out under counterpressure for the bottling of carbonated beverages. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyer arrangement that is designed to move bottles, for example, from an inspecting machine to the filling machine.

After a filling process has been completed, the filled beverage bottles are transported or conveyed to a closing machine, which is often a rotary closing machine. A revolving or rotary machine comprises a rotor, which revolves around a central, vertical machine axis. There may further be provided a conveyer arrangement configured to transfer filled bottles from the filling machine to the closing station. A transporting or conveying arrangement can utilize transport star wheels as well as linear conveyors. A closing machine closes bottles by applying a closure, such as a screw-top cap or a bottle cork, to a corresponding bottle mouth. Closed bottles are then usually conveyed to an information adding arrangement, wherein information, such as a product name or a manufacturer's information or logo, is applied to a bottle. A closing station and information adding arrangement may be connected by a corresponding conveyer arrangement. Bottles are then sorted and packaged for shipment out of the plant.

Many beverage bottling plants may also possibly comprise a rinsing arrangement or rinsing station to which new, non-return and/or even return bottles are fed, prior to being filled, by a conveyer arrangement, which can be a linear conveyor or a combination of a linear conveyor and a starwheel. Downstream of the rinsing arrangement or rinsing station, in the direction of travel, rinsed bottles are then transported to the beverage filling machine by a second conveyer arrangement that is formed, for example, by one or more starwheels that introduce bottles into the beverage filling machine.

It is a further possibility that a beverage bottling plant for filling bottles with a liquid beverage filling material can be controlled by a central control arrangement, which could be, for example, a computerized control system that monitors and controls the operation of the various stations and mechanisms of the beverage bottling plant.

The present application relates to a device and a method for pasteurizing containers filled with liquid, such as for example beverage bottles or beverage cans. In this case, part of the heat exchanger is realized by a heat pump being provided between one or more segments of the pasteurizing zone and those of the cooling zone.

Pasteurizing systems and methods for preserving foodstuffs in the beverage industry are known and are used in multiple ways. In the case of these systems, containers such as bottles, cans, bags, or similar containers are conducted in a substantially continuous manner through a pasteurizing device in a ready flow or one after the other.

These pasteurizing devices and methods are structured in such a manner that for gentle heating and cooling, the liquid-filled containers are conveyed through segments with respectively downwardly orientated temperatures. The pasteurizing zone, which can also be segmented and in which the temperature is essentially held at a suitably high level, is positioned between the segmented heating and cooling zone. In the interior of the device, the containers are sprayed or showered with liquid so as to realize the heating, cooling or the isotherm state.

The pasteurizing process or the hygenisation, in this case, is substantially dependent on the temperature and on the dwell time. As the temperature of the closed containers can be increased in a limited manner, the dwell time has to or should be increased, which means that the pasteurizing devices are structurally very large. In normal operation, they have a large liquid volume with a high energy content. Conducting the liquid of the segments of the heating and cooling zone in a suitable manner back and forth in order to recover as much heat as possible is also known.

The problem of one possible process is that the pasteurizing devices have to be structurally very large to cool the pasteurized and filled containers in the desired recuperative manner; however, it is possible to achieve a cooling temperature that is a little above the temperature of the first heating segment.

To save energy and have better controllability, some pasteurizing devices do not to shower the filled containers in the pasteurizing zone in normal operation and to achieve flexible optimum control by means of suitable interconnection and irrigation of the collecting liquid. As there is no energy application in the pasteurizing zone in normal operation, it is to be assumed that to achieve identical preservation, a comparable amount of energy has to or should be brought into the heating zone, which means that, if anything, the entire device increases in size.

Some pasteurizing devices connect the pasteurizing system to the filling system in such a manner that the container filling is preheated and the closed containers enter the pasteurizing process at a slightly increased temperature. A connection of this type may possibly reduce the end temperature at the outlet, however the transferable heat quantity is limited as the temperature of the liquid to be filled must or should not be increased in an arbitrary manner upstream of the filing process in order to prevent, restrict, and/or minimize, amongst other things, serious frothing.

OBJECT OR OBJECTS

It is an object of the present application, consequently, to provide a structurally improved pasteurizing device that has no or limited disadvantages economically or in energy efficiency compared to the state of the art.

SUMMARY

This object is achieved by means of the present application. This relates to a pasteurizing device for the thermal treatment of liquids present in closed containers, said pasteurizing device comprising a heating zone, a pasteurizing zone and a cooling zone, wherein each zone can comprise one or more segments. The liquid-filled containers are conveyed in normal operation through the segments from the inlet of the pasteurizing device to its outlet, wherein irrigation devices are provided for heating, pasteurizing and/or cooling in the segments. For heat recovery, the irrigation liquid of one or more segments is collected in collecting vessels and said liquids are exchanged in a suitable manner between individual segments for the purposes of heating or cooling. The pasteurizing device according to the present application, in this case, includes a heat pump which is connected to a segment of the pasteurizing zone and a segment of the cooling zone by means of lines and conveying units in such a manner that part of the thermal energy of the liquid volume of a segment of the cooling zone is transferable into a segment of the pasteurizing zone by means of said heat pump.

At least one possible embodiment of the pasteurizing device according to the present application comprises:

a) a conveying unit and a line are connected to the collecting vessel of a pasteurizing segment, wherein the line leads to the hot side of the heat pump, with which it is in thermal contact, and said line leads from there downstream in front of the irrigation device of a pasteurizing segment, and b) another conveying unit and a line are connected to the collecting vessel of a cooling segment, wherein said line leads to the cold side of the heat pump, with which it is in thermal contact, and said line leads from there downstream in front of the irrigation device of a cooling segment.

In this case, the hot side of the heat pump refers to the side that is provided for heat output and the cold side refers to the side that is provided for heat absorption.

This direct heating of part of the irrigation water certainly provides very effective heat input into the pasteurizing segment because no heat exchanger is used downstream. In addition, it is easy to control the required and/or desired temperature by mixing with a corresponding quantity of hot water.

At least one possible embodiment of the present application comprises a mixing device or mixing section is provided upstream of the irrigation device, a fresh water line, as well as the line coming from the heat pump, also leading into said mixing device or mixing section. Consequently, even in the case of, for example, interruptions caused by damage, overheating in the pasteurizing zone can be prevented, restricted, and/or minimized in an effective and very simple manner. In the case of smaller disturbances, it is not even necessary and/or desired to throttle the output of the heat pump or to disconnect the circuit temporarily.

Essentially there are two interconnection variants that make sense. On the one hand, one where the segment of the cooling zone connected by means of the heat pump and suitable lines is a segment that is not connected in a recuperative manner to a segment of the pasteurizing zone. On the other hand, the variant where the segment of the cooling zone connected via the heat pump is a segment that is connected in a recuperative manner to a segment of the pasteurizing zone. Naturally combinations are also conceivable or processes possible that take temporary marginal climatic conditions into account. One possible embodiment of this type could also comprise more than one segment of the cooling zone is connected via a heat pump and suitable lines to one or more segments of the pasteurizing zone, wherein said segments of the cooling zone can provide recuperatively linked segments or cold segments without recuperative linking.

A method for pasteurizing liquid media is also included in the present application, where a pasteurizing device according to one of the aforementioned specific embodiments is used. At least one possible embodiment according to the present application, the liquid that comes from the heat exchanger and flows to a pasteurizing segment has a maximum of the required and/or desired temperature of the irrigation liquid of the respective segment and, in an one possible embodiment, has a temperature that is five degrees to fifteen degrees below said required and/or desired temperature. In one possible embodiment of a method variant of this type, the heat pump can run continuously or substantially continuously at constant or substantially constant output and a comparably small volumetric flow of hot water has to or may be added. This volumetric flow is removed from the pasteurizing segment as circuit liquid and is heated in a known manner by means of an external heat exchanger.

A pasteurizing device of known design, with an inlet temperature of twelve degrees Celsius and an outlet temperature of 31.8 degrees Celsius and an original length of fifteen meters could be constructed shorter by about three meters by using a heat pump. The pasteurizing device in the design according to the present application with the identical inlet temperature had an even lower outlet temperature of 30.9 degrees Celsius. This was able to be achieved without increasing the operating costs for the energy demand.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in the following with reference to the accompanying drawing figures of embodiments of the present application.

DESCRIPTION OF EMBODIMENT OR EMBODIMENTS

Figure 1:
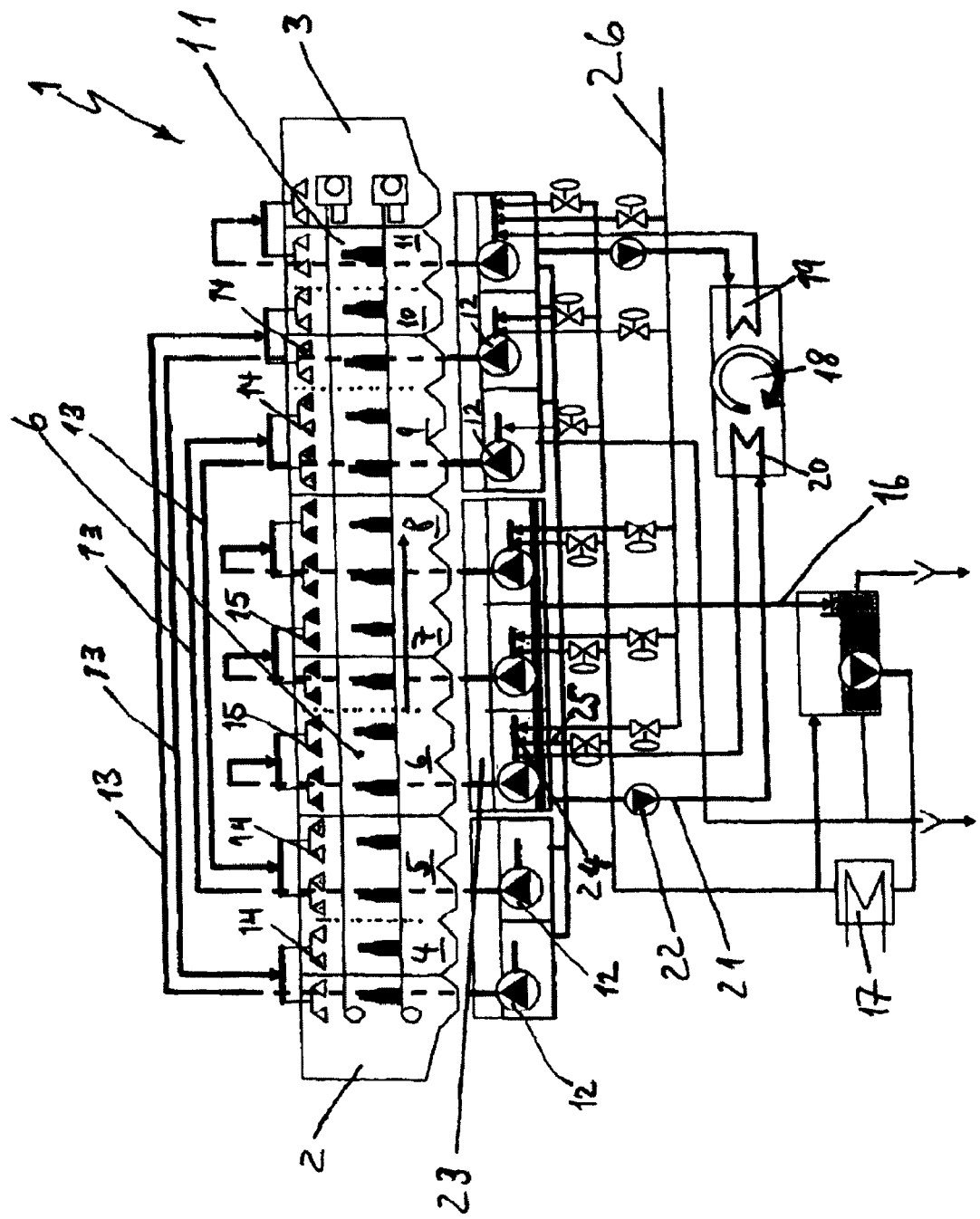
FIG. 1 shows a pasteurizing device and a pasteurizing method are outlined below in one possible embodiment.

The schematic representation in FIG. 1 shows the pasteurizing device 1, which has an inlet 2, an outlet 3, and a plurality of segments 4 through 11. From left to right, consequently, schematically represented vessels that have been conducted into the inlet 2, run through heating segment 4, heating segment 5, pasteurizing segments 6, 7 and 8, cooling segment 9, cooling segment 10 and cold segment 11. The segments 4 and 10 and the segments 5 and 9 are interconnected in a recuperative manner, the collected irrigation water is collected therein, conveyed by means of pumps 12 and via the lines 13 to the respective other segment and is irrigated there by means of suitable, known irrigation devices 14. The irrigation water in the pasteurizing segments 7 and 8 is also collected and is irrigated once again as an internal circuit in the same segment by means of the irrigation devices 15. To this end, a part flow 16 is continuously removed and guided over a heat exchanger 17 for heating and subsequently irrigated in the pasteurizing segments 7 and 8.

The heat pump 18 in FIG. 1 can be seen to have a cold side 19 and a hot side 20. The cold segment 11 and the pasteurizing segment 6 are indirectly connected in a thermal manner by means of the heat pump 18. The water collected in the cold segment 11 is removed and conveyed to the cold side 19 of the heat pump 18, where the energy is removed from it so that colder water flows back into the cold segment 11 and is there directly irrigated. The transferable energy portion recovered in this manner is discharged on the hot side 20 of the heat pump 18 to the irrigation water, which has been removed from the collecting vessel 23 of the pasteurizing segment 16 via the line 21 and pump 22. In the mixing section 24 the hot return water coming from the heat pump 18 is mixed in a suitable manner with the hot water part flow from line 25 and/or a cold water part flow from line 26.

Figure 2A:
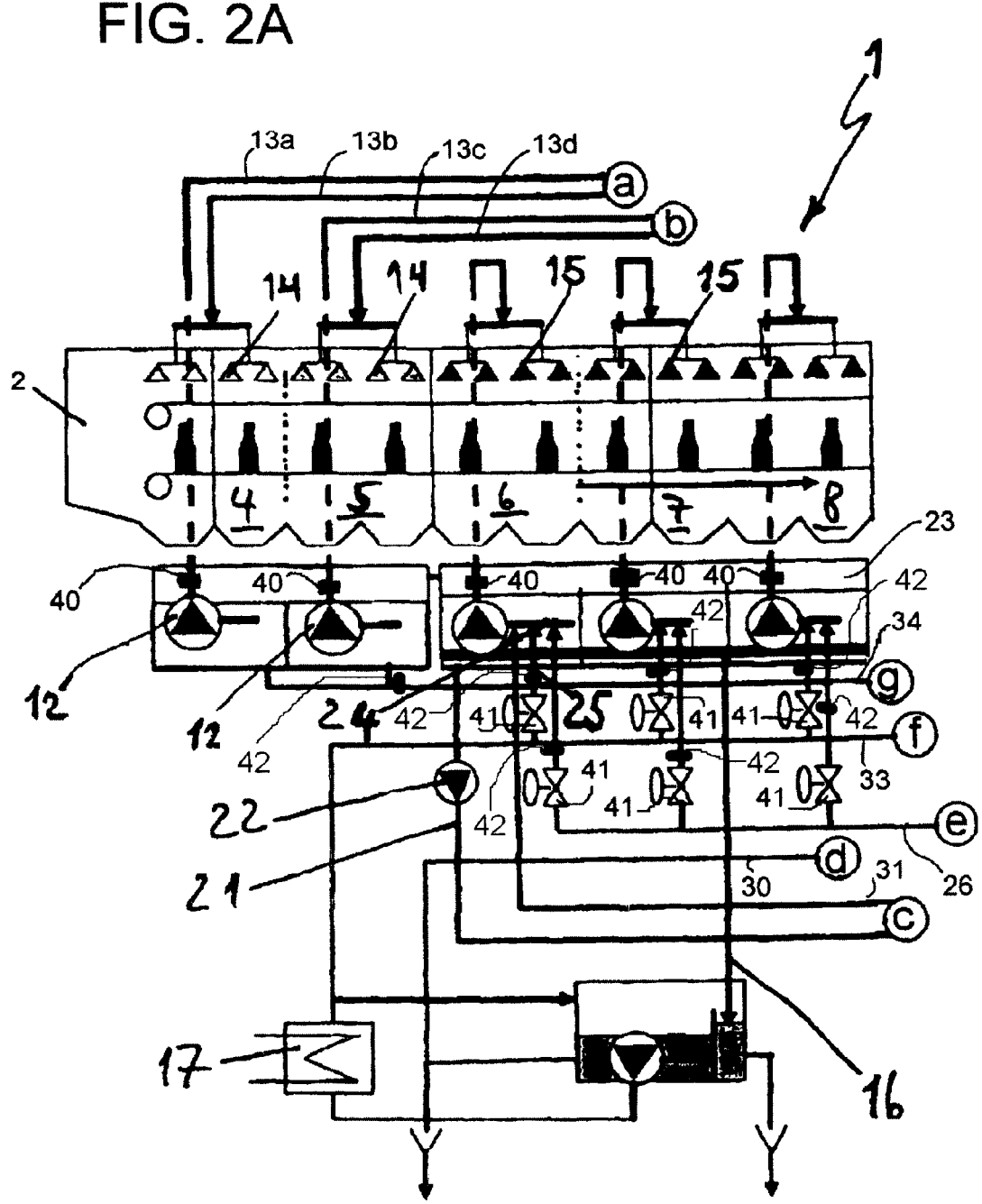
FIG. 2A shows at least a portion of a pasteurizing device according to one possible embodiment.

FIG. 2A shows at least a portion of a pasteurizing or treatment device 1 of the present application, comprising an inlet 2 and heating segments 4 and 5 and pasteurizing or treating segments 6 through 8. Water is transported to and from the heating segments 4 and 5 by lines 13a, 13b, 13c, and 13d. The a in FIG. 2A is operatively connected to the a in FIG. 2B, and the b in FIG. 2A is operatively connected to the b in FIG. 2B. The irrigation devices 14 and 15 eject water in order to heat, treat, and/or pasteurize filled containers. A plurality of pumps 12 are configured to convey pump water from a collection area to the lines and their corresponding irrigation devices. Disposed downstream of each pump 12 is a temperature sensor 40. The temperature sensors 40 are configured to sense the temperature of the water being pumped by the pumps 12. FIG. 2A also shows a part flow 16, heat exchanger 17, a line 21, a pump 22 a collecting vessel 23, a mixing section 24, a line 25, and a line 26. The c in FIG. 2A is operatively connected to the c in FIG. 2B. The d in FIG. 2A is operatively connected to the d in FIG. 2B. The e in FIG. 2A is operatively connected to the e in FIG. 2B. The f in FIG. 2A is operatively connected to the f in FIG. 2B. The g in FIG. 2A is operatively connected to the g in FIG. 2B.

FIG. 2A also shows valves 41, which are disposed on the lines upstream from the pumps and irrigation devices. These valves 41 permit the adjustment of the temperature of the water by increasing or decreasing the flow of water passing through the valves 41. For example, cool or cold water may be permitted to flow through the line 26 and into the mixing section 24 by the opening of the corresponding downstream valve 41, thereby reducing the temperature of the water in the mixing section 24. Additionally, cool or cold water may not be permitted to flow through the line 26 and into the mixing section 24 by the closing of the corresponding downstream valve 41, thereby not reducing the temperature of the water in the mixing section 24.

Upstream of the pumps 12 are additional temperature sensors 42. These temperature sensors 42 may be configured to sense the temperature of the water flowing through the valves 41 before the water is pumped by the pumps 12.

Figure 2B:
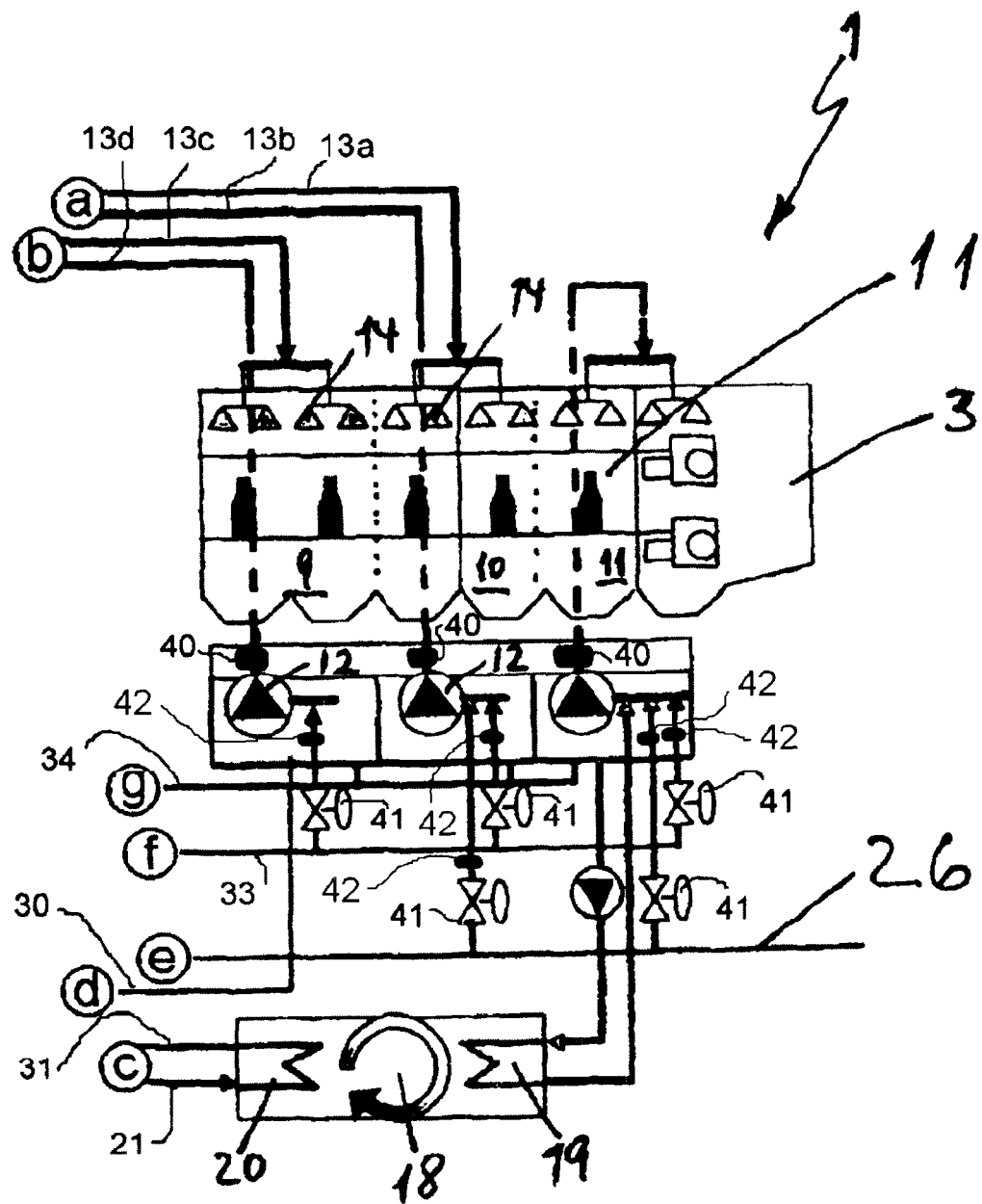
FIG. 2B shows at least a portion of a pasteurizing device according to one possible embodiment.

FIG. 2B shows at least a portion at a pasteurizing device according to the present application, comprising an outlet 3, cooling segments 9 and 10, cold segment 11, pumps 12, lines 13a, 13b, 13c, and 13d, irrigation devices 14, heat pump 18, cold side 19, hot side 20, line 26, temperature sensors 40, valves 41, and additional temperature sensors 42.

Figure 3:
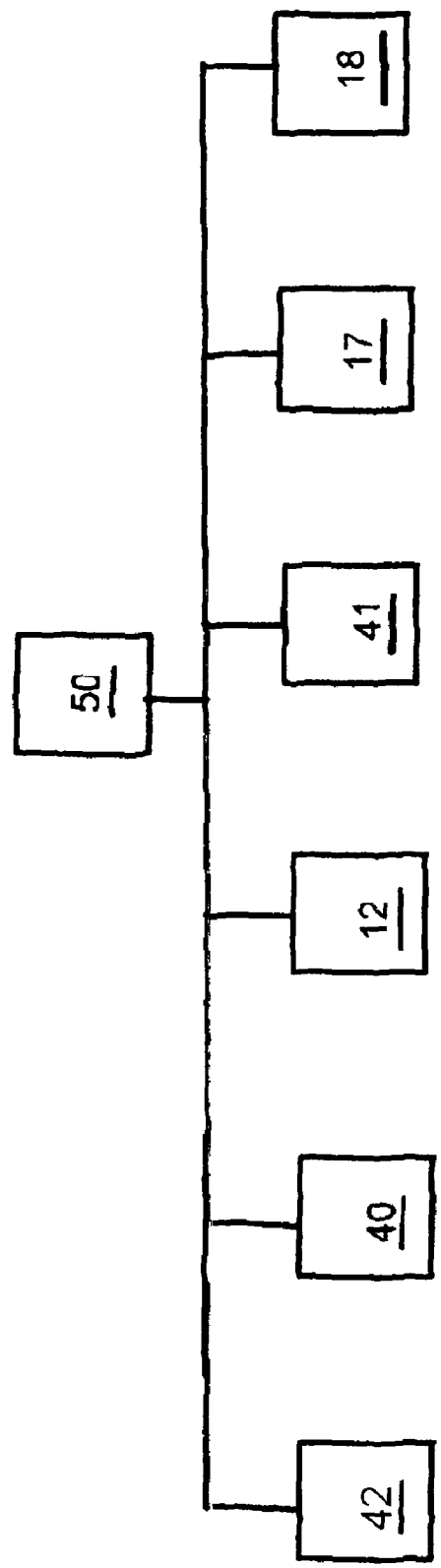
FIG. 3 is a block diagram of a computer arrangement and components of a pasteurizing device according to one possible embodiment of the present application.

FIG. 3 is a block diagram, showing a computer, computer arrangement, or control unit 50. The computer arrangement 50 is configured to operatively control pumps 12, heat exchanger 17, heat pump 18, temperature sensors 40, and valves 41, and thereby control the temperature of the water and/or irrigation fluid and the flow of the water and/or irrigation fluid.

Figure 3A:
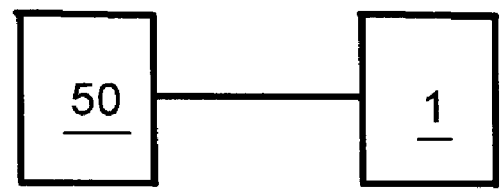
FIG. 3A is a block diagram of a computer arrangement and a pasteurizing device according to at least one possible embodiment of the present application.

FIG. 3A is a block diagram of a computer or control arrangement 50, which is operatively connected to the pasteurization device or arrangement 1. The control arrangement 50 is configured to control the functions and parameters of the pasteurizing device 1, 366 which may include pumps, heat exchangers, heat pumps, sensors, and valves, among other possible controllable devices or arrangements.

Figure 4:
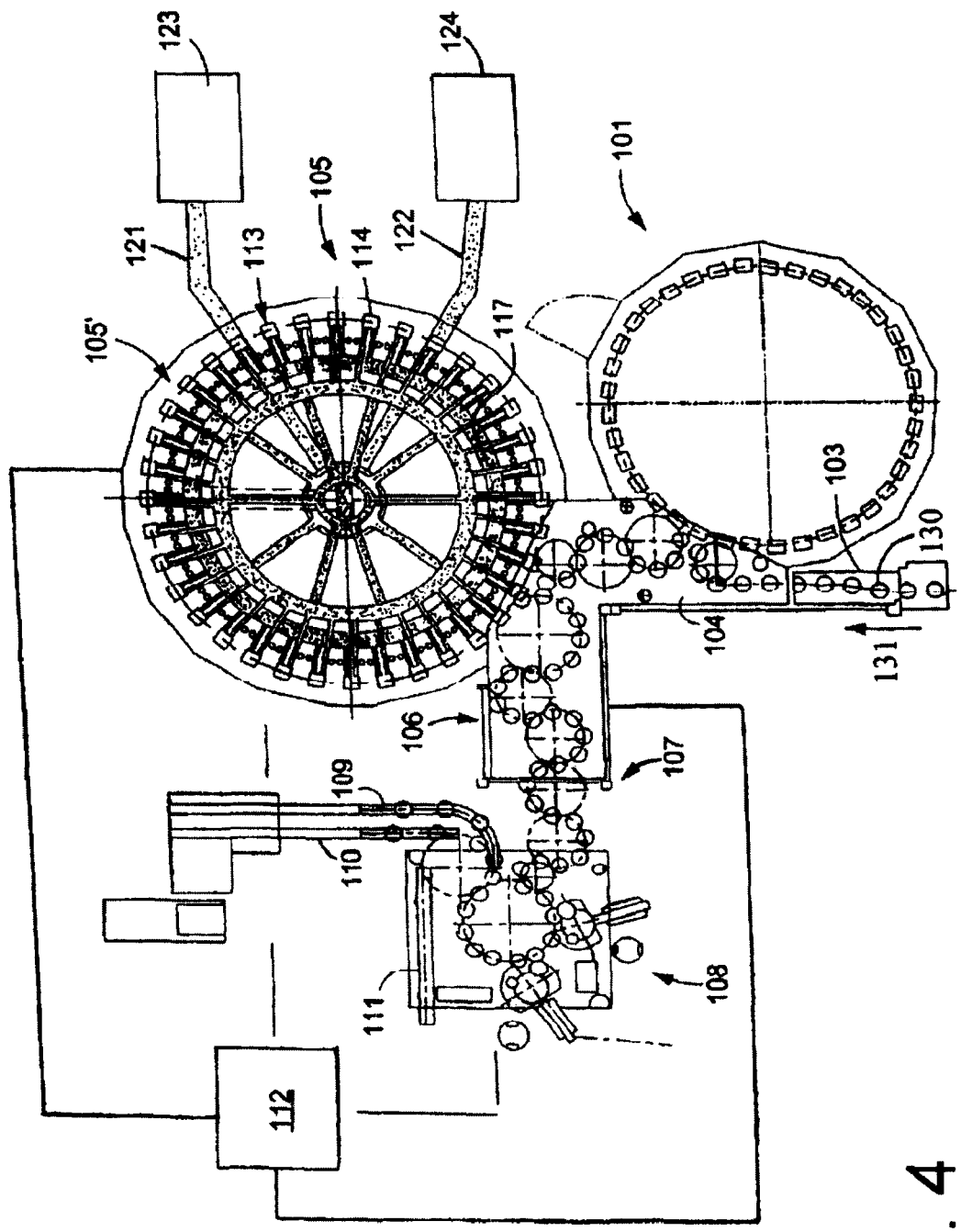
FIG. 4 shows schematically the main components of one possible embodiment example of a system for filling containers, for example, a beverage bottling plant for filling bottles with at least one liquid beverage, in accordance with at least one possible embodiment, in which system or plant could possibly be utilized at least one aspect, or several aspects, of the embodiments disclosed herein.

FIG. 4 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 4 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 4, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyer arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The present application relates to a pasteurizing device for the thermal treatment of liquids present in closed containers, said pasteurizing device comprising a heating zone, a pasteurizing zone and a cooling zone, wherein each zone can comprise one or more segments, and the filled containers can be directed through the segments from the inlet of the pasteurizing device to its outlet and irrigation devices are provided for the heating, pasteurizing and/or cooling in the segments, wherein, for heat recovery, the irrigation liquid of one or more segments is collected in a collecting vessel and said liquids are exchanged in a suitable manner between individual segments for the purposes of heating or cooling. The pasteurizing device, in this case, includes a heat pump, which is connected to a segment of the pasteurizing zone and a segment of the cooling zone by means of lines and conveying units in such a manner that part of the thermal energy of the liquid volume of a segment of the cooling zone is transferable into a segment of the pasteurizing zone by means of said heat pump.

In at least one possible embodiment of the present application, the pasteurizing device 1 may be used to pasteurize liquids in filled containers other than beverage material.

One feature or aspect of an embodiment is believed at the time of the filing of this patent application to possibly reside broadly in a pasteurizing device for the thermal treatment of liquids present in closed containers, said pasteurizing device comprising a heating zone, a pasteurizing zone and a cooling zone, wherein each zone can comprise one or more segments, and the liquid-filled containers can be directed through the segments from the inlet of the pasteurizing device to its outlet and irrigation devices are provided for the heating, pasteurizing and/or cooling in the segments, wherein, for heat recovery, the irrigation liquid of one or more segments is collected in a collecting vessel and said liquids are exchanged in a suitable manner between individual segments for the purposes of heating or cooling, wherein the pasteurizing device includes a heat pump, which is connected to a segment of the pasteurizing zone and a segment of the cooling zone by means of lines and conveying units in such a manner that part of the thermal energy of the liquid volume of a segment of the cooling zone is transferable into a segment of the pasteurizing zone by means of said heat pump.

Another feature or aspect of an embodiment is believed at the time of the filing of this patent application to possibly reside broadly in the pasteurizing device, wherein a conveying unit and a line are connected to the collecting vessel of a pasteurizing segment, wherein the line leads to the hot side of the heat pump, with which it is in thermal contact, and said line leads from there downstream in front of the irrigation device of a pasteurizing segment, and another conveying unit and a line are connected to the collecting vessel of a cooling segment, wherein said line leads to the cold side of the heat pump, with which it is in thermal contact, and said line leads from there downstream in front of the irrigation device of a cooling segment, wherein the hot side of the heat pump refers to the side that is provided for heat output and the cold side refers to the side that is provided for heat absorption.

Yet another feature or aspect of an embodiment is believed at the time of the filing of this patent application to possibly reside broadly in the pasteurizing device, wherein a mixing device or mixing section is provided upstream of the irrigation device, a fresh water line, as well as the line coming from the heat pump, also leading into said mixing device or mixing section.

Still another feature or aspect of an embodiment is believed at the time of the filing of this patent application to possibly reside broadly in the pasteurizing device, wherein the segment of the cooling zone connected via the heat pump and suitable lines is a segment that is not connected in a recuperative manner to a segment of the pasteurizing zone.

A further feature or aspect of an embodiment is believed at the time of the filing of this patent application to possibly reside broadly in the pasteurizing device, wherein the segment of the cooling zone connected via the heat pump is a segment that is connected in a recuperative manner to a segment of the pasteurizing zone.

Another feature or aspect of an embodiment is believed at the time of the filing of this patent application to possibly reside broadly in the pasteurizing device, wherein more than one segment of the cooling zone is connected via a heat pump and suitable lines to one or more segments of the pasteurizing zone, wherein said segments of the cooling zone can provide recuperatively linked segments or cold segments without recuperative linking.

Yet another feature or aspect of an embodiment is believed at the time of the filing of this patent application to possibly reside broadly in a method for pasteurizing liquid media by means of a method where a pasteurizing device according to the present application is used.

Still another feature or aspect of an embodiment is believed at the time of the filing of this patent application to possibly reside broadly in the method, wherein the liquid that comes from the heat exchanger and flows to a pasteurizing segment, has a maximum of the required and/or desired temperature of the irrigation liquid of the respective segment and, in one possible embodiment, has a temperature that is five degrees to fifteen degrees below this required and/or desired temperature.

A further feature or aspect of an embodiment is believed at the time of the filing of this patent application to possibly reside broadly in a pasteurizing device for the thermal treatment of liquids present in closed containers, said pasteurizing device comprising a heating zone, a pasteurizing zone and a cooling zone, wherein each zone can comprise one or more segments, and the filled liquid containers can be directed through all the segments from the inlet of the pasteurizing device to its outlet and irrigation devices are provided for the heating, pasteurizing and/or cooling in the segments, wherein, for heat recovery, the irrigation liquid of one or more segments is collected in a collecting vessel and said liquids are exchanged in a suitable manner between individual segments for purposes of heating or cooling, whereby the pasteurizing device includes a heat pump, which is connected to a segment of the pasteurizing zone and a segment of the cooling zone by means of lines and conveying units in such a manner that part of the thermal energy of the liquid volume of a segment of the cooling zone is transferable into a segment of the pasteurizing zone by means of said heat pump characterized in that a mixing device or mixing section is provided upstream of the irrigation device, into which the fluid stream coming from the heat pump can be mixed with fluids from the same section, other sections and/or fresh water.

One feature or aspect of an embodiment is believed at the time of the filing of this patent application to possibly reside broadly in a beverage bottling plant for filling bottles with a liquid beverage filling material, said beverage bottling plant comprising: a bottle cleaning machine being configured and disposed to clean empty bottles; a feed arrangement being configured to supply empty bottles to said bottle cleaning machine; a beverage filling machine being configured and disposed to fill empty bottles with liquid beverage material; said beverage filling machine comprising a plurality of beverage filling devices for filling bottles with liquid beverage material; at least one reservoir being configured and disposed to store a supply of liquid beverage material; at least one supply line being configured and disposed to connect said at least one reservoir to said beverage filling machine to supply liquid beverage material to said beverage filling machine; a first conveyer arrangement being configured and disposed to move empty bottles from said bottle cleaning machine into said beverage filling machine; said first conveyer arrangement comprising a star wheel structure; a bottle closing machine being configured and disposed to close tops of filled beverage bottles; a second conveyer arrangement being configured and disposed to move filled beverage bottles from said beverage filling machine into said bottle closing machine; said second conveyer arrangement comprising a star wheel structure; a beverage bottle treatment arrangement being configured and disposed to treat liquid beverage material in filled, closed beverage bottles; said third conveyer arrangement comprising a star wheel structure; a beverage bottle labeling station being configured and disposed to label filled, closed beverage bottles; a fourth conveyor arrangement being configured and disposed to move filled, closed beverage bottles into said beverage bottle labeling station; said fourth conveyer arrangement comprising a star wheel structure; said beverage bottle treatment arrangement comprising: an inlet being configured and disposed to receive filled, closed beverage bottles; a first, heating, zone being configured and disposed to heat liquid beverage material in filled, closed beverage bottles to a first temperature; said first, heating, zone comprising a first heating segment and a second heating segment; a second, treating, zone being configured and disposed to treat liquid beverage material in filled, closed beverage bottles at a second temperature; said second, treating, zone comprising a first treating segment, a second treating segment, and a third treating segment; a third, cooling, zone being configured and disposed to cool liquid beverage material in filled, closed beverage bottles to a third temperature; said third, cooling, zone comprising a first cooling segment, a second cooling segment, and a third cooling segment; an outlet being configured and disposed to move filled, closed beverage bottles out of said beverage bottle treatment arrangement; said first, heating, zone, said second, treating, zone, and said third, cooling, zone each comprising a plurality of spraying devices, which plurality of spraying devices are configured and disposed to eject water onto filled, closed beverage bottles; said treatment arrangement further comprising: a source of fresh water; a collecting vessel being configured and disposed to collect ejected water; at least one pump, said at least one pump being configured to supply water to said plurality of spraying devices; at least one valve, said at least one valve being configured to regulate water flow to said plurality of spraying devices; an arrangement interconnecting said plurality of spraying devices and said collecting vessel and being configured to adjust temperature and flow of liquid circulating in said treatment arrangement; a heat exchanger being configured and disposed to heat water to be supplied to said plurality of spraying devices; a heat pump being operatively connected to said first treating segment of said second, treating, zone and being operatively connected to said third cooling segment of said third, cooling, zone; and a mixing section being disposed upstream of said plurality of spraying devices and being configured to permit mixing of water from one interconnected segment, other interconnected segments, said heat exchanger, said heat pump, and said fresh water source.

Another feature or aspect of an embodiment is believed at the time of the filing of this patent application to possibly reside broadly in the beverage bottling plant, wherein: said heat pump of said beverage bottle treatment arrangement comprises: a hot side configured to output heat; and a cold side configured to absorb heat; said beverage bottle treatment arrangement further comprises: a first conveying unit; and a first line; said first conveying unit and said first line are connected to said collecting vessel; said first line is further connected to said hot side of said heat pump; said first line is disposed downstream from said plurality of spraying devices of said first, treatment, zone; said beverage bottle treatment arrangement further comprises: a second conveying unit; and a second line; said second conveying unit and said second line are connected to said collecting vessel; said second line is further connected to said cold side of said heat pump; and said second line is disposed downstream from said plurality of spraying devices in said third, cooling, zone.

Yet another feature or aspect of an embodiment is believed at the time of the filing of this patent application to possibly reside broadly in the beverage bottling plant, wherein said third segment of said third, cooling, zone is connected, via said heat pump, said first line, and said second line, to said first treating segment of said second, treating, zone, which first treating segment of said second, treating, zone is not connected in a recuperative manner to any other segment of any other zone.

Still another feature or aspect of an embodiment is believed at the time of the filing of this patent application to possibly reside broadly in the beverage bottling plant arrangement, wherein said third cooling segment of said third, cooling, zone connected via said heat pump is connected in a recuperative manner to said first treating segment of said second, treating, zone.

A further feature or aspect of an embodiment is believed at the time of the filing of this patent application to possibly reside broadly in the beverage bottling plant, wherein: said interconnecting arrangement of said beverage bottle treatment arrangement comprises: a third line configured to permit the flow of water from said first heating segment to said second cooling segment; a fourth line configured to permit the flow of water from said second cooling segment to said first heating segment; a fifth line configured to permit the flow of water from said second heating segment to said first cooling segment; a sixth line configured to permit the flow of water from said first cooling segment to said second heating segment; said beverage bottle treatment arrangement further comprises at least one temperature sensor configured and disposed to sense the temperature of water being pumped to said plurality of spraying devices.

Another feature or aspect of an embodiment is believed at the time of the filing of this patent application to possibly reside broadly in the beverage bottling plant, wherein more than one segment of the cooling zone is connected via a heat pump and suitable lines to one or more segments of the treating zone, wherein said segments of the cooling zone can provide recuperatively linked segments or cold segments without recuperative linking.

Yet another feature or aspect of an embodiment is believed at the time of the filing of this patent application to possibly reside broadly in a beverage bottle pasteurizing arrangement in a beverage bottling plant, said beverage bottle pasteurizing arrangement comprising: an inlet being configured and disposed to receive filled, closed beverage bottles; a first, heating, zone being configured and disposed to heat liquid beverage material in filled, closed beverage bottles to a first temperature; a second, pasteurizing, zone being configured and disposed to pasteurize liquid beverage material in filled, closed beverage bottles at a second temperature; a third, cooling, zone being configured and disposed to cool liquid beverage material in filled, closed beverage bottles to a third temperature; an outlet being configured and disposed to move filled, closed beverage bottles out of said beverage bottle pasteurizing arrangement; said first, heating, zone, said second, pasteurizing, zone, and said third, cooling, zone each comprising a plurality of spraying devices, which plurality of spraying devices are configured and disposed to eject water onto filled, closed beverage bottles; a source of fresh water; at least one collecting vessel being configured and disposed to collect ejected water; at least one pump, said at least one pump being configured to supply water to said plurality of spraying devices; at least one valve, said at least one valve being configured to regulate water flow to said plurality of spraying devices; an arrangement interconnecting said plurality of spraying devices and said at least one collecting vessel and being configured to adjust temperature and flow of liquid circulating in said beverage bottle pasteurizing arrangement; a heat exchanger being configured and disposed to heat water to be supplied to said plurality of spraying devices; a heat pump being operatively connected to said second, pasteurizing, zone and being operatively connected to said third, cooling, zone; and a mixing section being disposed upstream of said plurality of spraying devices and being configured to permit mixing of water from one interconnected zone, other interconnected zone, said heat exchanger, said heat pump, or said fresh water source.

Yet another feature or aspect of an embodiment is believed at the time of the filing of this patent application to possibly reside broadly in the beverage bottle pasteurizing arrangement, wherein said heat pump comprises: a hot side configured to output heat; and a cold side configured to absorb heat.

Still another feature or aspect of an embodiment is believed at the time of the filing of this patent application to possibly reside broadly in the beverage bottle pasteurizing arrangement, wherein: said beverage bottle pasteurizing arrangement further comprises: a first conveying unit; and a first line; said first conveying unit and said first line are connected to said at least one collecting vessel; said first line is further connected to said hot side of said heat pump; said first line is disposed downstream from said plurality of spraying devices of said pasteurizing zone; said beverage bottle pasteurizing arrangement further comprises: a second conveying unit; and a second line; said second conveying unit and said second line are connected to said at least one collecting vessel; said second line is further connected to said cold side of said heat pump; and said second line is disposed downstream from said plurality of spraying devices in said cooling zone.

A further feature or aspect of an embodiment is believed at the time of the filing of this patent application to possibly reside broadly in the beverage bottle pasteurizing arrangement, wherein a portion of said cooling zone is connected, via said heat pump, said first line, and said second line, to a portion of said pasteurizing zone, which portion of said pasteurizing zone is not connected in a recuperative manner to any other portion of any other zone.

Another feature or aspect of an embodiment is believed at the time of the filing of this patent application to possibly reside broadly in the beverage bottle pasteurizing arrangement, wherein said portion of said cooling zone connected via said heat pump is connected in a recuperative manner to at least a portion of said pasteurizing zone.

Yet another feature or aspect of an embodiment is believed at the time of the filing of this patent application to possibly reside broadly in the beverage bottle pasteurizing arrangement, wherein: said heating zone further comprises a first heating segment and a second heating segment; said pasteurizing zone comprises a first pasteurizing segment, a second pasteurizing segment, and a third pasteurizing segment; said cooling zone comprises a first cooling segment, a second cooling segment, and a third cooling segment; said interconnecting arrangement of said beverage bottle pasteurizing arrangement comprises: a third line configured to permit the flow of water from said first heating segment to said second cooling segment; a fourth line configured to permit the flow of water from said second cooling segment to said first heating segment; a fifth line configured to permit the flow of water from said second heating segment to said first cooling segment; a sixth line configured to permit the flow of water from said first cooling segment to said second heating segment; said a beverage bottle pasteurizing arrangement further comprises at least one temperature sensor configured and disposed to sense the temperature of water being pumped to said plurality of spraying devices.

Still another feature or aspect of an embodiment is believed at the time of the filing of this patent application to possibly reside broadly in the beverage bottle pasteurizing arrangement, wherein more than one segment of the cooling zone is connected via a heat pump and suitable lines to one or more segments of the pasteurizing zone, wherein said segments of the cooling zone can provide recuperatively linked segments or cold segments without recuperative linking.

A further feature or aspect of an embodiment is believed at the time of the filing of this patent application to possibly reside broadly in a liquid-filled container pasteurizing arrangement in a container filling plant configured to fill containers with liquid, said liquid-filled container pasteurizing arrangement comprising: an inlet being configured and disposed to receive liquid-filled, closed containers; a heating zone being configured and disposed to heat liquid material in liquid-filled, closed containers to a first temperature; a pasteurizing zone being configured and disposed to pasteurize liquid material in liquid-filled, closed containers at a second temperature; a cooling zone being configured and disposed to cool liquid material in liquid-filled, closed containers to a third temperature; an outlet being configured and disposed to move liquid-filled, closed containers out of said liquid-filled container pasteurizing arrangement; said heating zone, said pasteurizing zone, and said cooling zone each comprising a plurality of spraying devices, which plurality of spraying devices are configured and disposed to eject water onto liquid-filled, closed containers; a source of fresh water; at least one collecting vessel being configured and disposed to collect ejected water; at least one pump, said at least one pump being configured to supply water to said plurality of spraying devices; at least one valve, said at least one valve being configured to regulate water flow to said plurality of spraying devices; an arrangement operatively interconnecting said plurality of spraying devices and said at least one collecting vessel, said at least one pump, and said at least valve and being configured to adjust temperature and flow of liquid circulating in said liquid-filled container pasteurizing arrangement; a heat pump being operatively connected to said pasteurizing zone and said cooling zone; and a mixing arrangement being disposed upstream of said plurality of spraying devices and being configured to permit mixing of water from one interconnected zone, other interconnected zone, said heat pump, and said fresh water source.

One feature or aspect of an embodiment is believed at the time of the filing of this patent application to possibly reside broadly in the liquid-filled container pasteurizing arrangement, wherein said heat pump comprises: a hot side configured to output heat; and a cold side configured to absorb heat.

Another feature or aspect of an embodiment is believed at the time of the filing of this patent application to possibly reside broadly in the liquid-filled container pasteurizing arrangement, wherein: said liquid-filled container pasteurizing arrangement further comprises: a first conveying unit; and a first line; said first conveying unit and said first line are connected to said at least one collecting vessel; said first line is further connected to said hot side of said heat pump; said first line is disposed downstream from said plurality of spraying devices of said pasteurizing zone; said liquid-filled pasteurizing arrangement further comprises: a second conveying unit; and a second line; said second conveying unit and said second line are connected to said at least one collecting vessel; said second line is further connected to said cold side of said heat pump; and said second line is disposed downstream from said plurality of spraying devices in said cooling zone.

Yet another feature or aspect of an embodiment is believed at the time of the filing of this patent application to possibly reside broadly in the liquid-filled container pasteurizing arrangement, wherein a portion of said cooling zone is connected, via said heat pump, said first line, and said second line, to a portion of said pasteurizing zone, which portion of said pasteurizing zone is not connected in a recuperative manner to any other portion of any other zone.

Still another feature or aspect of an embodiment is believed at the time of the filing of this patent application to possibly reside broadly in the liquid-filled container pasteurizing arrangement, wherein said portion of said cooling zone connected via said heat pump is connected in a recuperative manner to at least a portion of said pasteurizing zone.

A further feature or aspect of an embodiment is believed at the time of the filing of this patent application to possibly reside broadly in the liquid-filled container pasteurizing arrangement, wherein: said heating zone further comprises a first heating segment and a second heating segment; said pasteurizing zone comprises a first pasteurizing segment, a second pasteurizing segment, and a third pasteurizing segment; said cooling zone comprises a first cooling segment, a second cooling segment, and a third cooling segment; said interconnecting arrangement of said liquid-filled container pasteurizing arrangement comprises: a third line configured to permit the flow of water from said first heating segment to said second cooling segment; a fourth line configured to permit the flow of water from said second cooling segment to said first heating segment; a fifth line configured to permit the flow of water from said second heating segment to said first cooling segment; a sixth line configured to permit the flow of water from said first cooling segment to said second heating segment; said liquid-filled container pasteurizing arrangement further comprises at least one temperature sensor configured and disposed to sense the temperature of water being pumped to said plurality of spraying devices.

Another feature or aspect of an embodiment is believed at the time of the filing of this patent application to possibly reside broadly in the liquid-filled container pasteurizing arrangement, wherein more than one segment of the cooling zone is connected via a heat pump and suitable lines to one or more segments of the pasteurizing zone, wherein said segments of the cooling zone can provide recuperatively linked segments or cold segments without recuperative linking.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Pasteurizing technology (INNOPAS): KHS pasteurizers are ideal for heating glass, plastic, and metal containers. Beverages and foods such as beer, vegetable juice, fruit juices, fruit juice drinks, and other products are thus biologically preserved. These machines operate fully automatically using the continuous flow processes to gradually heat, pasteurize, and recool the product to be pasteurized during the treatment period. Depending on the equipment installed, the pasteurizers are capable of outputs ranging from 10,000 to 200,000 containers per hour. Heaters: the INNOPAS W, equipped with a continuously running conveyor belt, is a fully automatic machine for warming up cold-filled beverages or food products. The heater's conveyor belt can be made of plastic for can and plastic bottle processing or stainless steel for glass bottle processing. Capacities range from 5,000 to 120,000 container per hour. Re-coolers: the INNOPAS K, equipped with a continuously running conveyor belt, is a fully automatic machine for re-cooling hot-filled beverages or food products. Depending on their size, the re-coolers are designed as compact or segment-type machines. You may choose between plastic and stainless steel chain belts as a conveyor medium. Capacities range from 5,000 to 50,000 containers per hour.

The following patents, patent applications or patent publications, are hereby incorporated by reference as if set forth in their entirety herein: DE 43 14 662 A1, having the following English translation of the German title "Continuous flow pasteurisation unit," published on Nov. 10, 1994; DE 203 17 441 U1, having the following English translation of the German title, "Pasteurization installation for beverage containers has support pipe with carriers having cut outs for spaced spray tubes," published on Jun. 9, 2004; DE 100 42 528 A1, having the following English translation of the German title, "Pasteurization system for products in containers has spraying devices in roof of pasteurization housing," published on Mar. 14, 2002; DE 199 08 035 A1, having the following English translations of the German title "Method and appliance for pasteurizing products involve conveyor heating-up, superheating, pasteurization and cooling zones and successive containers," published on Aug. 31, 2000; EP 0 430 907 B1, having the title "Apparatus for the control of a pasteurizing process," published on Jun. 5, 1991; and DE 694 14 611 T2, having the following English translation of the German title "PROCESS FOR THE PASTEURIZATION OF LIQUID CONTAINED AND TUNNEL PASTEURIZER FOR CARRYING-OUT SUCH PROCESS," published on Jul. 22, 1999.

All of the patents, patent applications or patent publications, which were cited in the German Office Action dated Oct. 16, 2007, and/or cited elsewhere are hereby incorporated by reference as if set forth in their entirety herein as follows: DE 1 963 688, having the following English translation of the German title "HEATING APPARATUS," published on Jun. 24, 1971; and DE 26 45 835, having the following German title "RIESELTROCKNER," published on Apr. 6, 1978.

All of the patents, patent applications or patent publications, which were cited in the International Search Report dated May 8, 2008, and/or cited elsewhere are hereby incorporated by reference as if set forth in their entirety herein as follows: FR 2,520,984, having the following French title "APPAREIL PASTEURISATEUR COMPRENANT UNE POMPE A CHALEUR," published on Aug. 12, 1983; U.S. Pat. No. 4,490,401, having the title "Pasteurization method," published on Dec. 25, 1984; and DE 103 51 689, having the following English translation of the German title "Method for operating a pasteurization plant," published on Jun. 16, 2005.

Some examples of control systems which measure operating parameters and learn therefrom that may possibly be utilized or possibly adapted for use in at least one possible embodiment of the present application may possibly be found in the following U.S. Pat. No. 4,655,188 issued to Tomisawa et al. on Apr. 7, 1987; No. 5,191,272 issued to Torii et al. on Mar. 2, 1993; No. 5,223,820, issued to Sutterlin et al. on Jun. 29, 1993; and No. 5,770,934 issued to Theile on Jun. 23, 1998.

Some examples of computer systems that may possibly be utilized or possibly adapted for use in at least one possible embodiment of the present application may possibly be found in the following U.S. Pat. No. 5,416,480 issued to Roach et al. on May 16, 1995; No. 5,479,355 issued to Hyduke on Dec. 26, 1995; No. 5,481,730 issued to Brown et al. on Jan. 2, 1996; No. 5,805,094 issued to Roach et al. on Sep. 8, 1998; No. 5,881,227 issued to Atkinson et al. on Mar. 9, 1999; and No. 6,072,462 issued to Moshovich on Jun. 6, 2000.

Some examples of control valve apparatus that may possibly be utilized or possibly adapted for use in at least one possible embodiment of the present application may possibly be found in the following U.S. Pat. No. 5,406,975 issued to Nakamichi et al. on Apr. 18, 1995; No. 5,503,184 issued to Reinartz et al. on Apr. 2, 1996; No. 5,706,849 issued to Uchida et al. on Jan. 13, 1998; No. 5,975,115 issued to Schwegler et al. on Nov. 2, 1999; No. 6,142,445 issued to Kawaguchi et al. on Nov. 7, 2000; and No. 6,145,538 issued to Park on Nov. 14, 2000.

Some examples of electric control valves that may possibly be utilized or possibly adapted for use in at least one possible embodiment of the present application may possibly be found in the following U.S. Pat. No. 4,431,160 issued to Burt et al. on Feb. 14, 1984; and No. 4,609,176 issued to Powers on Sep. 2, 1986.

Some examples of nozzle structures that may possibly be utilized or possibly adapted for use in at least one possible embodiment of the present application may possibly be found in the following U.S. Pat. No. 6,042,026 issued to Buehler, II on Mar. 28, 2000; No. 6,394,366 issued to Adams on May 28, 2002; No. 6,402,062 issued to Bendig et al. on Jun. 11, 2002; No. 6,616,072 issued to Harata et al. on Sep. 9, 2003; No. 6,666,386 issued to Huang on Dec. 23, 2003; and No. 6,681,498 issued to Steffan on Jan. 27, 2004.

Some examples of heater arrangements that may possibly be utilized or possibly adapted for use in at least one possible embodiment of the present application may possibly be found in the following U.S. Pat. No. 6,404,421 issued to Meijler et al. on Jun. 11, 2002; No. 6,515,264 issued to Toya et al. on Feb. 4, 2003; No. 6,548,786 issued to Takizawa et al. on Apr. 15, 2003; No. 6,555,796 issued to Cusack on Apr. 29, 2003; No. 6,633,727 issued to Henrie et al. on Oct. 14, 2003; and No. 6,677,557 issued to Ito et al. on Jan. 13, 2004.

Some examples of temperature sensors or sensor systems that may be used or adapted for use in at least one possible embodiment of the present invention may be found in the following U.S. Pat. No. 5,960,857, issued to inventors Oswalt et al. on Oct. 5, 1999; No. 5,942,980, issued to inventors Hoben et al. on Aug. 24, 1999; No. 5,881,952, issued to inventor MacIntyre on Mar. 16, 1999; No. 5,862,669, issued to inventors Davis et al. on Jan. 26, 1999; No. 5,459,890, issued to inventor Jarocki on Oct. 24, 1995; No. 5,367,602, issued to inventor Stewart on Nov. 22, 1994; No. 5,319,973, issued to inventors Crayton et al. on Jun. 14, 1994; No. 5,226,320, issued to inventors Dages et al. on Jul. 13, 1993; No. 5,078,123, issued to inventors Nagashima et al. on Jan. 7, 1992; and No. 5,068,030, issued to inventor Chen on Nov. 26, 1991.

Some examples of heaters or heat exchangers, cooling systems, valves, pumps, or tanks that may be used or adapted for use in at least one possible embodiment of the present invention may be found in the following U.S. Pat. No. 5,881,952, issued to inventor MacIntyre on Mar. 16, 1999; No. 5,862,669, issued to inventors Davis et al. on Jan. 26, 1999; No. 5,459,890, issued to inventor Jarocki on Oct. 24, 1995; No. 5,367,602, issued to inventor Stewart on Nov. 22, 1994; No. 5,319,973, issued to inventors Crayton et al. on Jun. 14, 1994; No. 5,226,320, issued to inventors Dages et al. on Jul. 13, 1993; No. 5,078,123, issued to inventors Nagashima et al. on Jan. 7, 1992; No. 5,068,030, issued to inventor Chen on Nov. 26, 1991; and No. 4,345,971, issued to inventor Watson on Aug. 24, 1982.

Some examples of bottling plants comprising pasteurizing or treatment devices which may possibly be utilized or adapted for use in at least one possible embodiment of the present application may possibly be found in the following U.S. Pat. No. 7,513,092, having the title "Beverage bottling plant for filling bottles with a liquid beverage filling material, and a method for the operation thereof," published on Apr. 7, 2009; No. 6,834,473, having the title "Bottling plant and method of operating a bottling plant and a bottling plant with sections for stabilizing the bottled product," published on Dec. 28, 2004; and No. 6,374,575, having the title "Bottling plant and method of operating a bottling plant," published on Apr. 23, 2002.

The patents, patent applications, and patent publication listed above in the preceding twelve paragraphs are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2007 003 976.1, filed on Jan. 26, 2007, having inventor Jan MÜNZER, and DE-OS 10 2007 003 976.1 and DE-PS 10 2007 003 976.1, and International Application No. PCT/EP2007/011009, filed on Dec. 14, 2007, having WIPO Publication No. WO 2008/089825 and inventor Jan MÜNZER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/EP2007/011009 and German Patent Application 10 2007 003 976.1, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/011009 and DE 10 2007 003 976.1 from which this patent application claims priority which do not have to do with the correction of the translation in this patent application are not to be included in this patent application in the incorporation by reference.

Any statements about admissions of prior art in the original foreign patent applications PCT/EP2007/011009 and DE 10 2007 003 976.1 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Pasteurizing device
2 Inlet
3 Outlet
4 Cold segment
5 Cold segment
6 Pasteurizing segment
7 Pasteurizing segment
8 Pasteurizing segment
9 Cooling segment
10 Cooling segment
11 Cold segment
12 Pump
13 Line
14 Irrigation device
15 Irrigation device
16 Part flow
17 Heat exchanger
18 Heat pump 19 Cold side of the heat pump
20 Hot side of the heat pump
21 Line
22 Pump
23 Collecting vessel
24 Mixing section
25 Line
26 Line

What is claimed is:

1. A pasteurizing arrangement configured to pasteurize liquid in closed containers, said pasteurizing arrangement comprising:
   a heating zone configured to heat a liquid in closed containers;
   a pasteurizing zone configured to pasteurize the heated liquid;
   a cooling zone configured to cool the pasteurized liquid;
   said heating zone, said pasteurizing zone, and said cooling zone each comprising a dispensing arrangement configured to dispense treatment liquid for treating the containers;
   a recycling arrangement configured to collect dispensed treatment liquid, and then transport the collected treatment liquid from one zone to another zone by transport lines to further utilize heat;
   said recycling arrangement comprising a heat pump being operatively connected to said cooling zone and said pasteurizing zone by said transport lines;
   said heat pump being configured to transfer a portion of the thermal energy of dispensed treatment liquid, collected from said cooling zone, to treatment liquid to be conducted to said pasteurizing zone; and
   a mixing arrangement being disposed upstream of said dispensing arrangements, and being configured to receive and mix treatment liquid from said heat pump and treatment liquid from at least one of: said zones and a source of fresh treatment liquid.

2. The pasteurizing arrangement according to claim 1, wherein each of said zones comprises zone segments.

3. The pasteurizing arrangement according to claim 2, wherein:
   said cooling zone segments comprise a last cooling zone segment disposed downstream of all other cooling zone segments;
   said pasteurizing zone segments comprise a first pasteurizing zone segment disposed upstream of all other pasteurizing zone segments; and
   said last cooling zone segment is operatively connected by said heat pump to said first pasteurizing zone segment.

4. The pasteurizing arrangement according to claim 3, wherein said dispensing arrangements are configured to dispense water as the treatment liquid, and said source of fresh treatment liquid comprises a source of fresh water.

5. The pasteurizing arrangement according to claim 4, wherein said heat pump comprises a hot side configured to output heat, and a cold side configured to absorb heat.

6. The pasteurizing arrangement according to claim 5, wherein:
   said first pasteurizing zone segment is connected to said hot side of said heat pump by a first transport line, which said first transport line is configured to transport water to said hot side to receive thermal energy from said heat pump, and then transport the water to said dispensing arrangement of said first pasteurizing zone segment; and
   said last cooling zone segment is connected to said cold side of said heat pump by a second transport line, which said second transport line is configured to transport water to said cold side to transmit thermal energy to said heat pump, and then transport the water to said dispensing arrangement of said last cooling zone segment.

7. The pasteurizing arrangement according to claim 6, wherein said last cooling zone segment is solely operatively connected to said first pasteurizing zone segment by said heat pump.

8. The pasteurizing arrangement according to claim 6, wherein said last cooling zone segment is directly connected by said transport lines to said first pasteurizing zone segment for the transport of water therebetween.

9. The pasteurizing arrangement according to claim 6, wherein additional cooling zone segments are connected to one or more pasteurizing zone segments by at least one of: an operative connection via said heat pump, and a direct connection via said transport lines.

10. The pasteurizing arrangement according to claim 1, wherein further comprising a control arrangement being configured to control the operation of said mixing arrangement and said source of fresh treatment liquid to supply cooler treatment liquid to said pasteurizing zone to mix with and cool treatment liquid in said pasteurizing zone to minimize overheating in said pasteurizing zone upon an interruption in movement of containers through the pasteurizing arrangement.

11. The pasteurizing arrangement according to claim 10, wherein said source of fresh treatment liquid is directly connected to both said mixing arrangement and said pasteurizing zone.

12. The pasteurizing arrangement according to claim 11, further comprising at least one temperature sensor configured and disposed to sense the temperature of treatment liquid in at least said zones.

13. The pasteurizing arrangement according to claim 12, wherein each of said zones comprises zone segments.

14. The pasteurizing arrangement according to claim 13, wherein:
   said cooling zone segments comprise a last cooling zone segment disposed downstream of all other cooling zone segments;
   said pasteurizing zone segments comprise a first pasteurizing zone segment disposed upstream of all other pasteurizing zone segments; and
   said last cooling zone segment is operatively connected by said heat pump to said first pasteurizing zone segment.

15. The pasteurizing arrangement according to claim 14, wherein said dispensing arrangements are configured to dispense water as the treatment liquid, and said source of fresh treatment liquid comprises a source of fresh water.

16. The pasteurizing arrangement according to claim 15, wherein said last cooling zone segment is solely operatively connected to said first pasteurizing zone segment by said heat pump.

17. The pasteurizing arrangement according to claim 15, wherein said last cooling zone segment is directly connected by said transport lines to said first pasteurizing zone segment for the transport of water therebetween.

18. The pasteurizing arrangement according to claim 15, wherein additional cooling zone segments are connected to one or more pasteurizing zone segments by at least one of: an operative connection via said heat pump, and a direct connection via said transport lines.

19. The pasteurizing arrangement according to claim 15, wherein:
   said heating zone further comprises a first heating zone segment and a second heating zone segment;

said pasteurizing zone comprises a second pasteurizing zone segment and a third pasteurizing zone segment disposed downstream of said first pasteurizing zone segment;

said cooling zone comprises a first cooling zone segment and a second cooling zone segment disposed upstream of said last cooling zone segment;

said recycling arrangement comprises:

a third transport line configured to permit the flow of water from said first heating zone segment to said second cooling zone segment;

a fourth transport line configured to permit the flow of water from said second cooling zone segment to said first heating zone segment;

a fifth transport line configured to permit the flow of water from said second heating zone segment to said first cooling zone segment; and a sixth transport line configured to permit the flow of water from said first cooling zone segment to said second heating zone segment.

20. The pasteurizing arrangement according to claim 15, wherein said dispensing arrangements comprise water sprayers.

* * * * *